United States Patent
Waller et al.

(10) Patent No.: US 10,725,718 B2
(45) Date of Patent: Jul. 28, 2020

(54) WORKFLOW NOTIFICATION MECHANISM

(75) Inventors: Marquis G. Waller, Beverly, OH (US);
Linda S. Liebelt, Boulder, CO (US);
Thomas N. Bilan, Longmont, CO (US);
Ioana C. Nagy, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 452 days.

(21) Appl. No.: 13/428,322

(22) Filed: Mar. 23, 2012

(65) Prior Publication Data
US 2013/0250345 A1    Sep. 26, 2013

(51) Int. Cl.
*G06F 3/12*    (2006.01)

(52) U.S. Cl.
CPC .............. *G06F 3/127* (2013.01); *G06F 3/126* (2013.01); *G06F 3/1207* (2013.01); *G06F 3/1259* (2013.01); *G06F 3/1288* (2013.01)

(58) Field of Classification Search
CPC ....... G06K 15/02; G06F 3/1288; G06F 3/126; G06F 3/1207
See application file for complete search history.

(56) References Cited

U.S. PATENT DOCUMENTS

| | | | |
|---|---|---|---|
| 2003/0214657 A1* | 11/2003 | Stringham | H04L 67/02 358/1.1 |
| 2004/0126122 A1* | 7/2004 | Kanamoto | G03G 15/36 399/20 |
| 2006/0017953 A1* | 1/2006 | Ly et al. | 358/1.13 |
| 2008/0158599 A1* | 7/2008 | Miwa | 358/1.15 |
| 2008/0273224 A1 | 11/2008 | Maulsby et al. | |
| 2009/0112668 A1 | 4/2009 | Abu El Ata | |
| 2010/0195155 A1 | 8/2010 | Gustafson et al. | |
| 2010/0225945 A1 | 9/2010 | Hatano | |
| 2010/0268690 A1 | 10/2010 | Anderson et al. | |
| 2011/0102839 A1* | 5/2011 | Nakajima | G06F 3/1211 358/1.15 |

* cited by examiner

*Primary Examiner* — Lennin R Rodriguezgonzalez
(74) *Attorney, Agent, or Firm* — Jaffery Watson Mendonsa & Hamilton LLP

(57) ABSTRACT

A print server is disclosed. The print server includes a printing software product that generates an object including one or more attributes defining work expected to be received in a printing system, assigns the object to an input device associated with a folder designated to receive the work, monitors the received work and provides a notification if the received work does not match the attributes of the object.

20 Claims, 4 Drawing Sheets

WORKFLOW NOTIFICATION MECHANISM

FIELD OF THE INVENTION

The invention relates to the field of computer systems, and in particular, to upgrading printing software products.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from job entry and management through the complete printing process. In high speed print production, printing software may manage a workflow including hundreds (or thousands) of print jobs. In such applications, one or more print jobs may be received at the printing software product without any sort of notification. Thus, those print jobs will not be processed.

Accordingly, a mechanism to notify a user when expected work is not received is desired.

SUMMARY

In one embodiment, a print server includes a printing software product that generates an object including one or more attributes defining work expected to be received in a printing system, assigns the object to an input device associated with a folder designated to receive the work, monitors the received work and provides a notification if the received work does not match the attributes of the object.

Another embodiment discloses an article of manufacture comprising a machine-readable medium including data that, when accessed by a machine, cause the machine to perform operations including generating an object including one or more attributes defining work expected to be received in a printing system, assigning the object to an input device associated with a folder designated to receive the work, monitoring the received work and providing a notification if the received work does not match the attributes of the object.

BRIEF DESCRIPTION OF THE DRAWINGS

A better understanding of the present invention can be obtained from the following detailed description in conjunction with the following drawings, in which.

DETAILED DESCRIPTION

A workflow notification mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
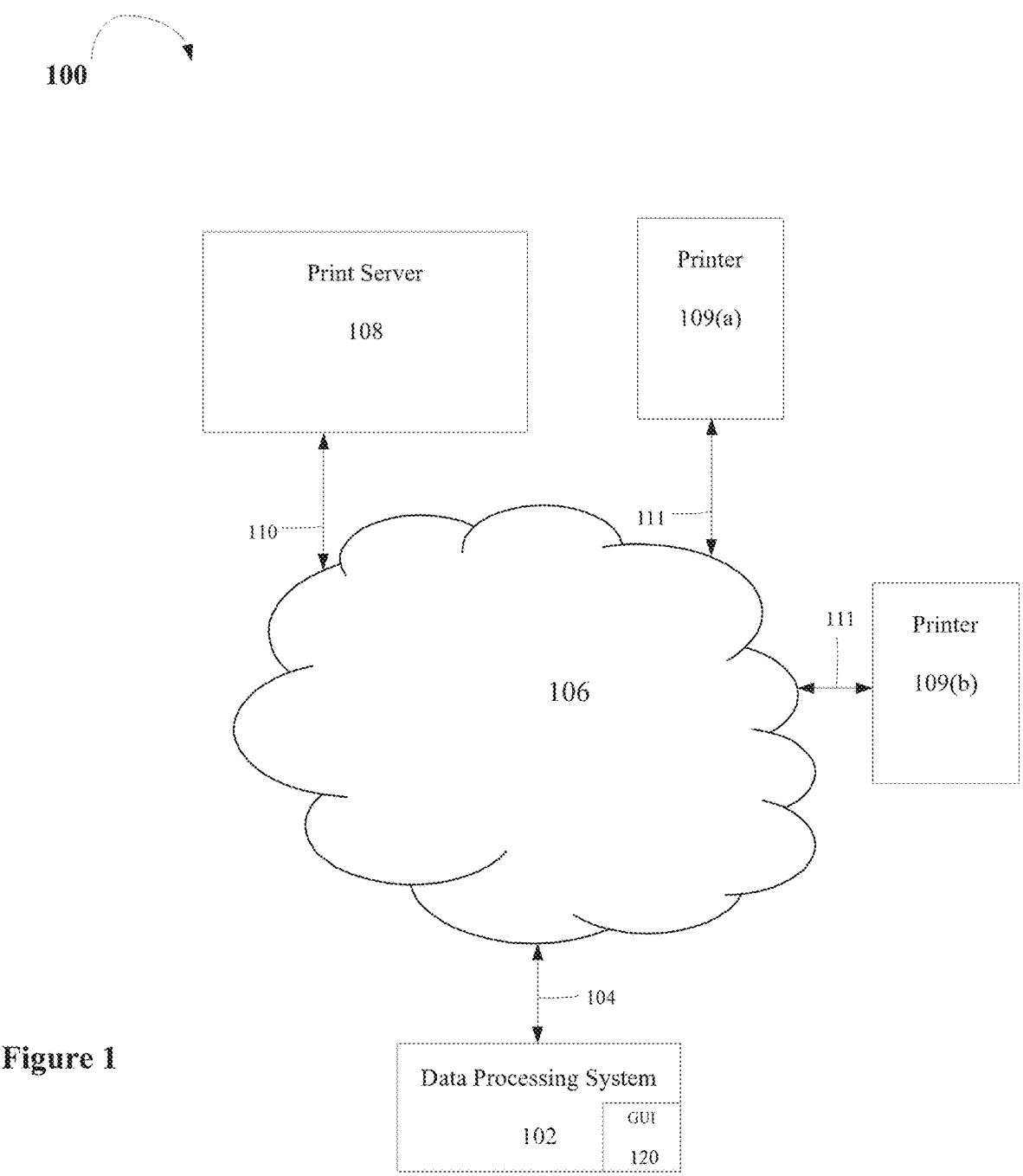
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software manages printing of documents from multiple data processing systems 102 to the one or more printers 109.

According to one embodiment, the printing software product may be implemented using either InfoPrint Manager (IPM) or InfoPrint ProcessDirector (IPPD), although other types of printing software may be used instead. In a further embodiment, data processing system 102 includes a print application thatinteracts with the printing software product at printer server 108 to provide for efficient transmission of print jobs.

In one embodiment, the printing software product includes a graphical user interface (GUI) 120 that enables a system administrator (or operator) to interact with the print application. In a further embodiment, an operator at data processing system 102 implements GUI 120 to automatically submit print jobs to the printing software product at printer server 108.

Figure 2:
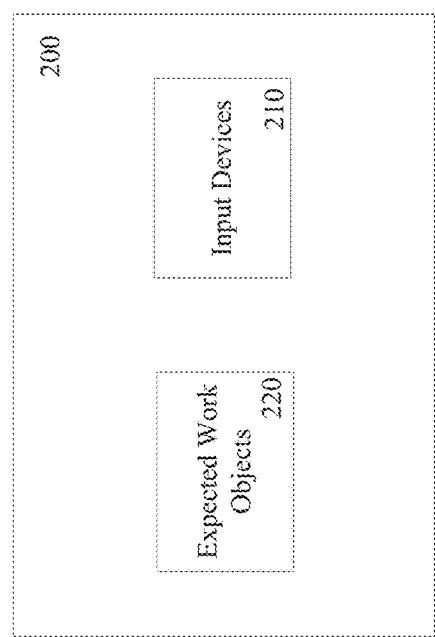
FIG. 2 illustrates one embodiment of a printing software product.

FIG. 2 illustrates one embodiment of components of a printing software product 200. Printing software product 200 includes one or more input devices 210 and one or more objects 210, referred to as Expected Work objects. Input devices 210 are implemented to monitor workflow folders (e.g., hot folders) to determine when a file is received at a folder. In one embodiment, one or more Expected Work objects 220 may be assigned to an input device 210 to provide notification as to whether print jobs are missing.

According to one embodiment, Expected Work objects 220 includes various attributes that define a set of rules (e.g., work schedule, number of files, pattern and file name) for work expected to be received. In one embodiment, pattern attributes enable the definition of patterns based on a print job name. Such patterns may provide more precise definition of the type of jobs. Scheduling attributes are related to a work schedule, and include: ExpectedWork.SLA.Frequency—attribute that includes one value from the list: Hourly, Daily, Weekly, Monthly, Yearly and Calendar Date; and ExpectedWork.SLA.ScheduleHourly—attribute that includes a value selection from the list: 1, 2, . . . 24. This attribute may be interpreted in the way that the input device 210 will expect a certain number of jobs at each x hours (where x=1 . . . 24).

Additional scheduling attributes include ExpectedWork.SLA.ScheduleDaily—attribute includes a value selection from the list: 1, 2, . . . 31, First, Last, which may be interpreted in the way that the input device will expect a certain number of jobs at each x days (where x=1 . . . 31 or each first day or last day of the month); Expected Work.SLA.ScheduleWeekly—attribute that includes a value selection from the list: 1, 2, 3, 4, which is interpreted in the way that the input device will expect a certain number of jobs at each x weeks (where x=1 . . . 4); ExpectedWork.SLA.ScheduleMonthly—attribute that that includes a value selection from the list: 1, 2, . . . 12, which may be interpreted in the way that the input device will expect a certain number of jobs at each x months (where x=1 . . . 12); ExpectedWork.SLA.ScheduleYearly—attribute that includes a value selection from the list: 1, 2, . . . 10, which may be interpreted such that the input device will expect a certain number of jobs at each x years (where x=1 . . . 10); and ExpectedWork.SLA.ScheduleCalendarDate—attribute including a value selected from a calendar and represented as a timestamp. This attribute represents a single date, and is not repetitive like the other choices.

The attributes also include a start time attribute ExpectedWork.SLA.StartTime. This attribute is a timestamp for which an operator introduces the day and time. This attribute specifies from which moment the interval begins to be monitored for the arrival of the expected work. In one embodiment, the ExpectedWork.SLA.StartTime attribute is a required attribute having the following format mm/dd/yyyy hh:mm or dd/mm/yyyy hh:mm, where:dd=Date, mm=Month, yyyy=Year, hh=Hour (0-24) and mm=Minutes. In a further embodiment, the start time provided by the operator is not validated to determine if the operator specified a date in the past. This is because even though the user can specify a time in the future, the Expected Work object 220 could be attached to the input device 210 at a time far after the specified Expected Work start time. Giving a start time in the past would not affect the functionality as the calculated checkpoints that are previous to the current date will be ignored. In an alternative embodiment, the start time of the Expected Work object 220 is set at the time it is associated to the input device 210, which makes this attribute non-editable by an operator (e.g., read only) of the system and set to be empty at the time the Expected Work object 220 is created.

The attributes further include an ExpectedWork.SLA.NumberOfJobsExpected attribute, which is an integer value that represents the number of jobs that are expected in the amount of time specified, where a value of 0 means no jobs are expected; Expected Work.SLA.NextCheckpoint—timestamp attribute that represents the time the next checkpoint will be made, calculated based on the Frequency and Schedule; Expected Work.SLA.Description attribute—a string representation of the object description (Max size 1024 characters); was last modified; and an Expected Work.SLA.ModifiedBy string attribute having a value representing the name of the operator that last modified the object.

According to one embodiment, the Expected Work object 220 supports Add, Copy, Delete, View log, Export, and Properties actions. In a further embodiment, the Expected Work objects 220 assigned to at least one input device 210 will not be available to be deleted or modified. In such an embodiment, an error message is displayed stating all input devices that use the specific ExpectedWork object 220 upon an operator attempting to delete or modify those objects.

According to one embodiment, input devices 210 also include attributes. These attributes include an InputDevice.SLA.ExpectedWork—which is a list of Expected Work objects associated with the input device 210. When some expected work does not arrive on schedule, the input device 210 that was expecting it provides a notification (e.g., the representation of the input device on the GUI turns red and a message is written to the input device log). When an operator verifies why the input device 210 has turned red, the operator may look in the log and see a message (e.g., 4 jobs expected, 3 received). The name of the Expected work schedule specified for the input device 210 may also be visible on the Input device property notebook (or say Input device displayed properties).

Another input device 210 attribute includes InputDevice.SLA.Work.Counter, which is an integer that includes a partial number of jobs while the input device 210 is receiving them. In the case of printing software product 200, a record is kept of the number of jobs from which to continue counting. In one embodiment, this attribute may be compared with the value of ExpectedWork.SLA.NumberOfJobsExpected attributes (since more ExpectedWork objects can be associated with the InputDevice) and after the time specified in the ExpectedWork object has elapsed, notification is provided (e.g., color the InputDevice 210 as redin the GUI) that there is a problem. Yet another input device 210 attribute is InputDevice.SLA.Late.Work, which includes a value of this attribute used by GUI 120 to determine if the Input device 210 will be colored red.

According to one embodiment, the input device 210 includes an action that will permit the operator to restore its state from error to OK (e.g., from red colored to normal color). In such an embodiment, the action is called 'Resolve Expected Work'. The action will be available regardless of the status of the input device 210. For example, in the case where the input device 210 has a status of missed expected work, its state will be restored to met, or in the case where the state of the input device 210 is already OK (e.g., no expected work missed), the action will do nothing and a message will be displayed saying that no expected work was missed. The state change as a result of executing this action will also be logged into the Input Device log.

Figure 3:
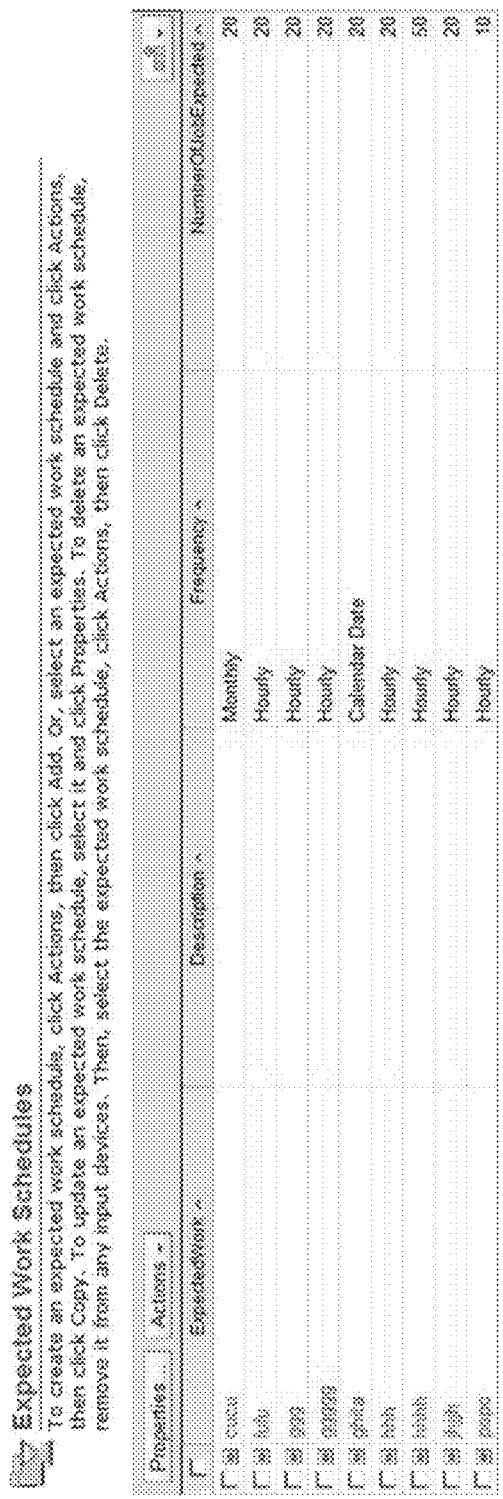
FIG. 3 illustrates a screen capture of one embodiment of a printing software product graphical user interface.

FIG. 3 illustrates one embodiment of a screen capture of GUI 120 showing expected work schedules. As shown in FIG. 3, each work schedule includes an Expected Work name (e.g., cucu), frequency and number of jobs included. When an Expected Work checkpoint was met or missed, information is logged in the input device 210 log.

Figure 4:
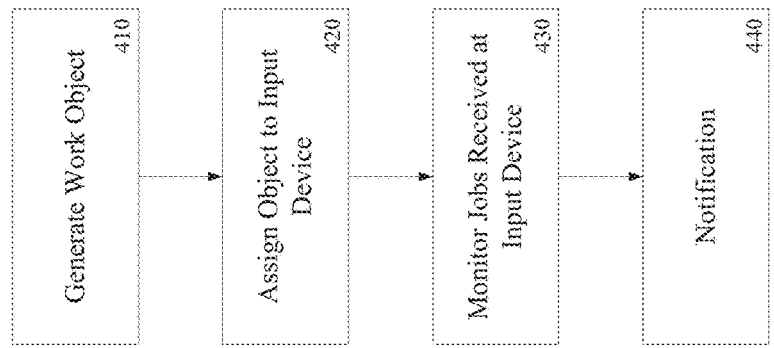
FIG. 4 is a flow diagram illustrating one embodiment of a process performed by a printing software product.

FIG. 4 is a flow diagram illustrating one embodiment of a process performed by printing software product 200. At processing block 410, an Expected Work object 220 is generated including one or more of the various attributes discussed above (e.g., scheduling, start time, number of jobs, etc.). At processing block 420, the Expected Work object 220 is assigned to an input device 210. As discussed above, an input device 210 may be assigned multiple objects 220 at any given time.

At processing block 430, the input device monitors 210 the workflow of print jobs received at the corresponding folder. In one embodiment, the input device monitors 210 the workflow by comparing the received work (via input device 210 attributes) to object 220 attributes. At processing block 440, the input device 440 provides a notification if the received work does not match the attributes of Expected Work object 220. For example, if the number of expected jobs has not been received as indicated by the number of jobs attribute within a time indicated by one of the scheduling attributes, a notification is provided.

Figure 5:
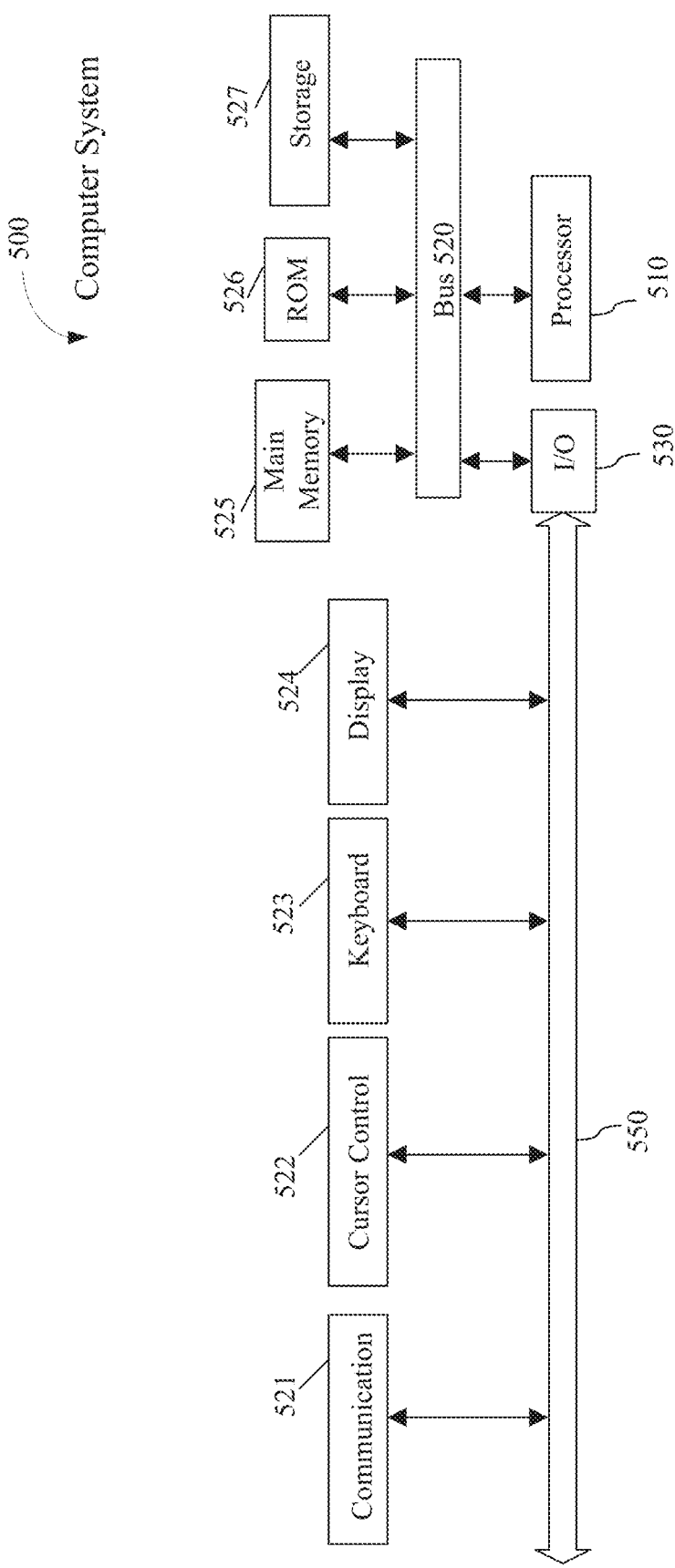
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 527 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. At least one non-transitory computer readable medium having instructions stored thereon, which when executed by one or more processors, cause the processors to:
   receive a workflow of print jobs; and
   process the plurality of print jobs for printing, including:
      assigning an object to an input device associated with a workflow folder designated to determine one or more print jobs received at the workflow folder, wherein the object includes one or more attributes defining a set of rules for print jobs expected to be received the workflow folder, and the object attributes have a scheduling attribute including a value that indicates a number of print jobs expected to be received in a time specified by the scheduling attribute;
      monitoring print jobs received at the workflow folder via the input device;
      transmitting a print request for the one or more print jobs upon determining that the received print jobs matches the object attributes;
      providing a notification upon determining that the received print jobs do not match the object attributes, wherein the notification is provided when the number of received print jobs in the time specified by the scheduling attribute does not match the value; and
      displaying the notification at a graphical user interface.

2. The article of manufacture of claim 1 wherein the object attributes include a start time attribute including a value that indicates when scheduled print jobs becomes active.

3. The article of manufacture of claim 1 wherein the object attributes include a next checkpoint attribute.

4. The article of manufacture of claim 1 wherein the input device includes one or more attributes.

5. The article of manufacture of claim 4 wherein the input device attributes include an expected work attribute having a list of expected work objects associated with the input device.

6. The article of manufacture of claim 5 wherein the input device attributes include a counter that counts a number of print jobs received.

7. The article of manufacture of claim 6 wherein the counter is compared with the value.

8. The article of manufacture of claim 7 wherein a notification is provided if the counter does not match the value after the time specified by the scheduling attribute.

9. The article of manufacture of claim 1 including data that, when accessed by a machine, further causes the machine to perform operations comprising generating the object.

10. The article of manufacture of claim 1 wherein the object attributes include print job name patterns, and the notification is provided upon a determination that the number of received print jobs in the time specified by the scheduling attribute that match the print job name patterns does not match the value.

11. The article of manufacture of claim 1 wherein displaying the notification comprises changing a color associated with a representation of the input device in the graphical user interface.

12. A system comprising:
at least one physical memory device to store a printing software product to; and
one or more processors coupled with the at least one physical memory device, to execute the printing software product to:
receive a workflow of print jobs; and
process the plurality of print jobs for printing, including:
assigning an object to an input device associated with a workflow folder designated to determine one or more print jobs received at the workflow folder, wherein the object includes one or more attributes defining a set of rules for print jobs expected to be received in a workload folder, and the object attributes have a scheduling attribute including a value that indicates a number of print jobs expected to be received in a time specified by the scheduling attribute, monitoring print jobs received at the workflow folder via the input device, transmitting a print request for the one or more print jobs upon determining that the received print jobs matches the object attributes and providing a notification upon determining that the received print jobs do not match the object attributes, wherein the notification is provided when the number of received print jobs in the time specified by the scheduling attribute does not match the value, and displaying the notification at a graphical user interface.

13. The print server of claim 12 wherein the object attributes include a start time attribute including a value that indicates when scheduled print jobs becomes active.

14. The print server of claim 12 wherein the input device includes one or more attributes.

15. The print server of claim 14 wherein the input device attributes include an expected work attribute having a list of expected work objects associated with the input device.

16. The print server of claim 15 wherein the input device attributes include a counter that counts a number of print jobs received.

17. The print server of claim 16 wherein the counter the counter is compared with the value.

18. The print server of claim 12 wherein the printing software product further generates the object.

19. The print server of claim 12 wherein the object attributes include print job name patterns, and the notification is provided upon a determination that the number of received print jobs in the time specified by the scheduling attribute that match the print job name patterns does not match the value.

20. The print server of claim 12 wherein displaying the notification comprises changing a color associated with a representation of the input device in the graphical user interface.

* * * * *